United States Patent
Maillard et al.

(10) Patent No.: US 7,310,323 B2
(45) Date of Patent: Dec. 18, 2007

(54) METHOD AND SYSTEM FOR PROVIDING A TRANSMISSION LINK FOR STREAMING TRAFFIC

(75) Inventors: Herve Maillard, Igny (FR); Claire Bazin, Paris (FR)

(73) Assignee: Alcatel, Paris (FR)

( * ) Notice: Subject to any disclaimer, the term of this patent is extended or adjusted under 35 U.S.C. 154(b) by 252 days.

(21) Appl. No.: 11/142,250

(22) Filed: Jun. 2, 2005

(65) Prior Publication Data

US 2005/0281218 A1 Dec. 22, 2005

(30) Foreign Application Priority Data

Jun. 22, 2004 (EP) .................. 04291578

(51) Int. Cl.
*H04Q 7/00* (2006.01)
(52) U.S. Cl. .................. 370/328; 370/338; 370/359; 455/442
(58) Field of Classification Search ........... 370/328, 370/331, 310.1, 338, 359; 455/442
See application file for complete search history.

(56) References Cited

U.S. PATENT DOCUMENTS

| | | | |
|---|---|---|---|
| 6,725,044 B2 * | 4/2004 | Verma et al. ........... | 455/444 |
| 2003/0236905 A1 | 12/2003 | Choi et al. | |
| 2004/0028009 A1 * | 2/2004 | Dorenbosch et al. ..... | 370/329 |
| 2004/0081119 A1 * | 4/2004 | Zhong et al. ........... | 370/328 |

FOREIGN PATENT DOCUMENTS

EP 0777396 A1 * 6/1997

OTHER PUBLICATIONS

M. Zuendt et al, "Seamless Handoff in Community Based and Location Aware Heterogeneous Wireless Networks", International Workshop on Mobile Multimedia Conference, Oct. 5, 2003, pp. 1-5, XP002281321.

* cited by examiner

*Primary Examiner*—Matthew D. Anderson
*Assistant Examiner*—Sanh Phu
(74) *Attorney, Agent, or Firm*—Sughrue Mion, PLLC

(57) ABSTRACT

Method for providing a transmission link includes providing a proxy equipment including cache or buffer, establishing a streaming connection or session between the proxy equipment and the mobile terminal, upon request of a service from the terminal requesting streaming data, receiving and storing at the equipment the requested streaming data from a server intended for the mobile terminal and forwarding the received and stored streaming data from the proxy equipment to the mobile terminal if the mobile terminal is detected to be under the coverage of and/or connected to the discontinuous coverage network, where when the request for the service by the mobile terminal is received by the proxy equipment, the proxy equipment establishes a continuous data and signaling transmission link with the server to receive the requested streaming data, and a discontinuous data transmission link with the mobile terminal to forward the received streaming data to the mobile terminal.

8 Claims, 2 Drawing Sheets

METHOD AND SYSTEM FOR PROVIDING A TRANSMISSION LINK FOR STREAMING TRAFFIC

BACKGROUND OF THE INVENTION

The invention is based on a priority application EP04291578.5 which is hereby incorporated by reference.

The present invention concerns the field of the telecommunications, more particularly in relation to services available through mobile terminals connectable to communication networks.

The present invention concerns more specifically a method and a system allowing to provide streaming data transmission, and associated services, to a mobile terminal, in particular from a streaming server.

In a discontinuous coverage network (also known as "info-station" system), downstream data flows (necessary to provide certain services at a mobile terminal) are managed and handled by taking into account the specific nature of the connection.

Thus, when a streaming service is considered, it would mean that the streaming server must have the ability to deliver discontinuously the data in a different manner for each mobile terminal according to its particular situation.

In fact, legacy streaming servers deliver the data regularly, at the bit rate of the media and not more. This is actually generally mandatory, among others for multicast sessions like "time staggered" or "live event" sessions. As a matter of fact, in such multicast sessions, the server cannot adapt its behaviour to a particular user.

The RTP (Real-time Transport Protocol) standard has defined a "translator function" which takes in charge the "per-user customisation" of the source coding, in the purpose of adapting the throughput of the data flow for a specific user depending on the bandwidth he/she can rely on.

Nevertheless, this known function does not handle the discontinuous aspect of the user's connectivity, and its impact on the provided quality and continuity of service.

It is a main aim of the present invention to overcome the aforesaid drawbacks and restrictions of the prior art.

To this end, the present invention concerns first a method for providing a transmission link, adapted for a streaming data traffic, to a mobile terminal connected to a discontinuous coverage network, characterised in that said method comprises the steps of:

- providing a proxy equipment comprising cache or buffer means for receiving and storing at said equipment streaming data intended for said mobile terminal,
- establishing a streaming connection or session between said proxy equipment and said mobile terminal, upon request of a service from said terminal requiring streaming data,
- forwarding streaming data from said proxy equipment to said mobile terminal when this latter is detected to be under the coverage of and/or connected to said discontinuous coverage network.

According to a main feature of the invention, when the request for a service requiring streaming data sent by the mobile terminal is received by the proxy equipment, this latter establishes a continuous data and signalling transmission link with the server providing the requested service and a discontinuous data transmission link with said mobile terminal.

SUMMARY OF THE INVENTION

So, the basic idea of the invention is to put a proxy equipment on the path between the streaming server and the mobile terminal. The proxy equipment is seen by the server as a continuously connected mobile terminal. The same proxy equipment is seen by the mobile terminal as being a streaming server dedicated to it, and able to deliver discontinuous flows adapted to its needs.

This proxy equipment includes a cache function in order to store the data from the streaming server before it forwards it, in a discontinuous manner, to the mobile terminal.

Additional advantageous features and embodiments of the inventive method are mentioned in dependant claims 3 to 6.

The invention does also concern a method for providing streaming services to a mobile terminal belonging to a discontinuous coverage network, characterised in that said method consists, upon each request of streaming services from said mobile terminal, in providing a transmission link or connection between said terminal and the concerned streaming server by using the method for providing streaming transmission in discontinuous transmission conditions, as described before.

Furthermore, the invention also encompasses a communication system able to provide a transmission link adapted for a streaming data traffic between a server and a mobile terminal connected or belonging to a discontinuous coverage network, characterised in that it also comprises a proxy equipment comprising cache or buffer means for receiving and storing at said equipment streaming data intended for said mobile terminal, said proxy equipment being able i) to establish a streaming connection or session between said proxy equipment and said mobile terminal, upon request of a service from said terminal requiring streaming data and ii) to forward streaming data to said mobile terminal when this latter is detected to be under the coverage of and/or connected to said discontinuous coverage network.

BRIEF DESCRIPTION OF THE DRAWINGS

The present invention will be better understood thanks to the following description and drawings of an embodiment of said invention given as a non limitative example thereof. Among these figures.

Figure 1:
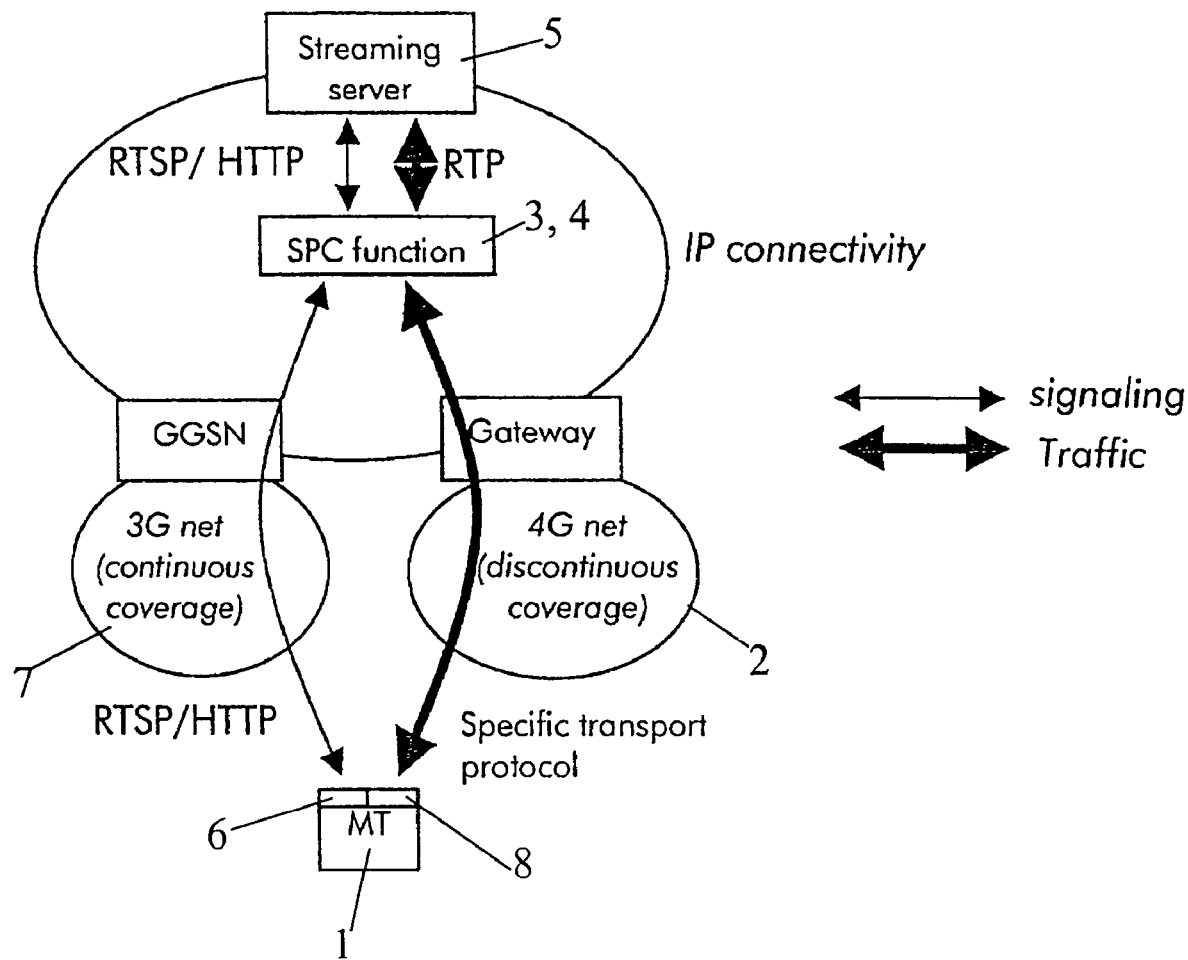
FIG. 1 is a schematical functional representation of a communication system according to the invention, and, FIG. 2 is a schematical structural representation of a communication system of the invention corresponding to the system of FIG. 1.

According to the invention, a method and a system are proposed which allow to provide a transmission link, adapted for a streaming data traffic, to a mobile terminal 1 connected to a discontinuous coverage network 2.

To this end, there is provided a proxy equipment 3 comprising cache or buffer means 4 for receiving and storing at said equipment streaming data intended for said mobile terminal 1, said proxy equipment being able:

i) to establish a streaming connection or session between said proxy equipment 3 and said mobile terminal 1, upon request of a service from said terminal requiring streaming data and, ii) to forward streaming data to said mobile terminal 1 when this latter is detected to be under the coverage of and/or connected to said discontinuous coverage network 2.

Preferably, the mobile terminal 1 includes at least two different communication interfaces 6, 8, at least one 6 allowing it to be connected to a network 7 with continuous coverage and at least one other 8 allowing it to be connected to the network 2 with discontinuous coverage, the setting up and control of the service by the mobile terminal 1 being performed through the network 7 with continuous coverage and the streaming data transmission being performed through the network 2 with discontinuous coverage, by making use of the corresponding adapted communication interfaces 6, 8.

When the request for a service requiring streaming data sent by the mobile terminal 1 is received by the proxy equipment 3, this latter establishes a continuous data and signalling transmission link, based on adapted protocols, with the server 5 providing the requested service and a discontinuous data transmission link with said mobile terminal 1.

According to a possible embodiment of the invention, in relation with wireless communication networks associated with Internet Protocol connectivity between said networks and the concerned server, the mobile terminal 1 sends, in order to establish a transmission link for a streaming data transmission between the considered server 5 and the mobile terminal 1, this latter sends a RTSP setup message towards said server 5 which is intercepted and modified by the proxy equipment 3 in order to establish a continuous RTP transmission link between said proxy equipment 3 and said considered server 5 and a discontinuous transmission link for streaming data transmission between said proxy equipment 3 and said mobile terminal 1.

Afterwards, the transmission link between the mobile terminal 1 and the proxy equipment 3 is managed by taking into consideration RTSP messages from said mobile terminal 1 and the specificities of their mutual discontinuous connection.

Preferably, prior to the sending of the RTSP setup message by the mobile terminal 1, the considered server 5 sends streaming session description data to the mobile terminal 1, said description data being recorded by the proxy equipment 3 in order to reserve adapted resources on the discontinuous network 2 and to setup the means needed for the discontinuous transmission link.

The invention will now be described more precisely by way of example in relation to enclosed FIGS. 1 and 2, based on a system able to perform the methods described herein before.

Figure 2:
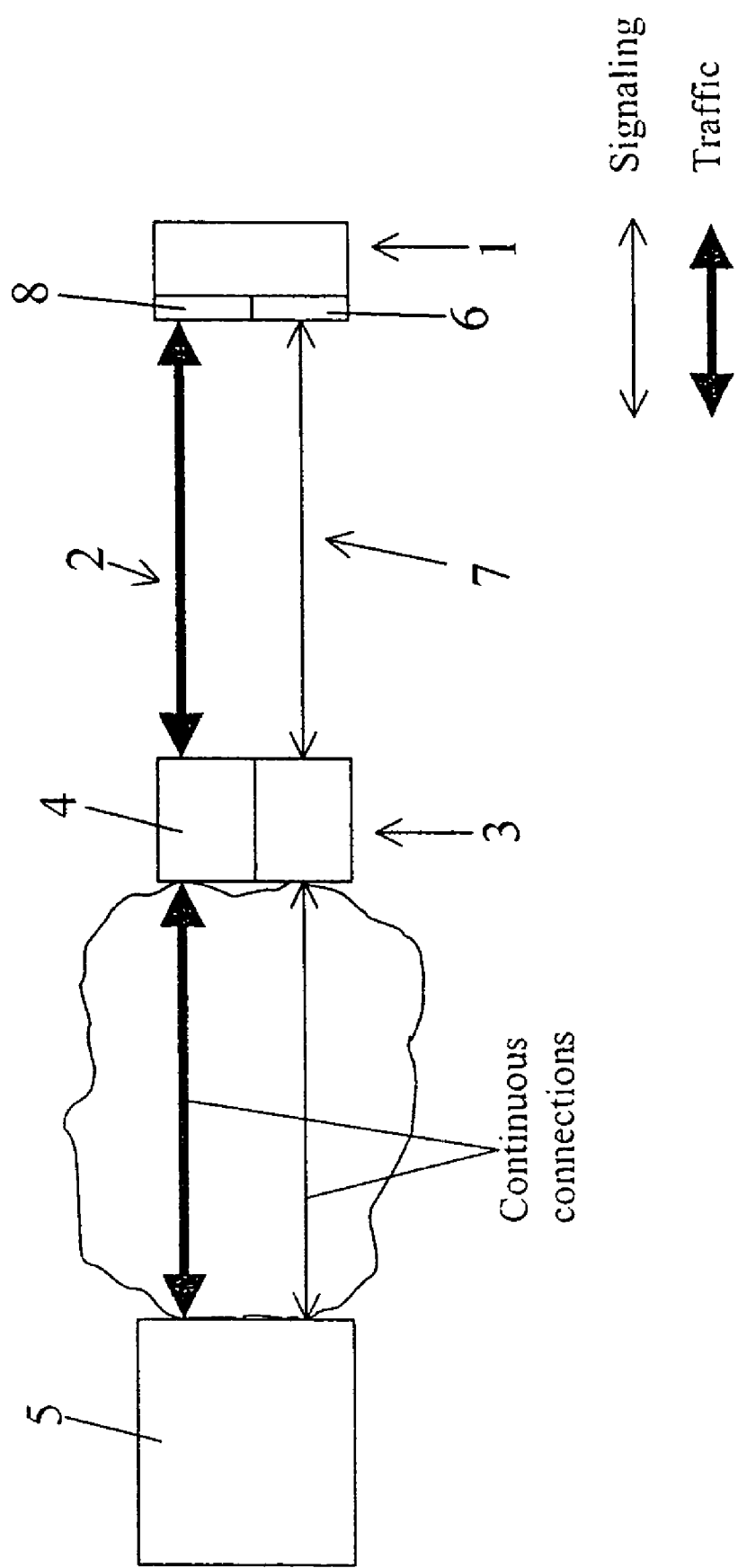

In the embodiment shown on FIGS. 1 and 2 the mobile terminal 1 has two interfaces 6 and 8: one towards a 3G network 7 with continuous coverage and the other towards 4G networks 2 with discontinuous coverage.

The mobile terminal 1 browses and selects an available streaming service, and afterwards controls the delivery of this service through said 3G network 7 using HTTP (Hyper Text Transfer Protocol) and RTSP (Real Time Streaming Protocol).

The mobile terminal 1 receives traffic related to the streaming service through the 4G network 2 using specific transport protocol adapted to the discontinuous nature of said traffic (on FIG. 1 GGSN stands for "Gateway GPRS Support Node").

The RTSP setup message is used to establish the RTP session that will support the streaming traffic. When the mobile terminal 1 sends such a message to the concerned server 5, the proxy equipment 3 with cache function intercepts and modifies it so that the RTP session is established between said equipment 3 and the server 5 instead of being established between the mobile terminal 1 and the server 5.

Prior to this message, some streaming session description are sent by the server 5 to the mobile terminal 1 (typically via SDP—Session Description Protocol). The proxy equipment 3 records such information for the purpose of resource reservation on the 4G network 2 for instance.

When possible (the mobile terminal 1 is in a hotspot and a sufficient amount of streaming data has been cached in the proxy equipment 3), the equipment 3 and the terminal 1 establish a 4G transport path for discontinuous delivery of streaming date.

During the overall duration of the session, the proxy equipment 3 controls:
1. the streaming sessions with the server 5,
2. the transport connection over the 4G network 2, according to an algorithm which takes into consideration both RTSP messages coming from the terminal 1 and specificities due to discontinuous traffic delivery.

For instance, PLAY/RESUME messages sent by the mobile terminal 1, may not be forwarded to the server 5, but may involve interruption, recovery of the traffic on the 4G transport connection. As a matter of fact, the mobile terminal 1 likely to display the media with very large delay compared with what is currently being sent by the server 5.

Hence, the PLAY/RESUME messages are not timely consistent with the server state, and it makes no sense to apply these commands to the server.

Thus, the invention is able to provide a method for providing streaming services to a mobile terminal belonging to a discontinuous coverage network, characterised in that said method consists, upon each request of streaming services from said mobile terminal 1, in providing a transmission link or connection between said terminal 1 and the concerned streaming server 5 by using the method set forth before.

The concerned services can be for example of one of the following types: "On-demand", "time staggered" or "live event".

The present invention is, of course, not limited to the preferred embodiment described and represented herein, changes can be made or equivalents used without departing from the scope of the invention.

What is claimed is:

1. Method for providing a transmission link, adapted for a streaming data traffic, to a mobile terminal connected to a discontinuous coverage network, wherein said method comprises:

providing a proxy equipment comprising cache or buffer means, establishing a streaming connection or session between said proxy equipment and said mobile terminal, upon request of a service from said terminal requesting streaming data, receiving and storing at said equipment the requested streaming data from a server intended for said mobile terminal, and forwarding the received and stored streaming data from said proxy equipment to said mobile terminal if said mobile terminal is detected to be under the coverage of and/or connected to said discontinuous coverage network;

wherein when the request for the service requesting the streaming data by said mobile terminal is received by said proxy equipment, said proxy equipment establishes a continuous data and signaling transmission link with the server to receive the requested streaming data, and a discontinuous data transmission link with said mobile terminal to forward the received streaming data to said mobile terminal.

2. Method according to claim 1, wherein the mobile terminal includes at least two different communication interfaces, at least one allowing it to be connected to a network with continuous coverage and at least one other allowing it to be connected to the network with discontinuous coverage, the setting up and control of the service by the mobile terminal being performed through the network with continuous coverage and the streaming data transmission being performed through the network with discontinuous coverage, by making use of the corresponding adapted communication interfaces.

3. Method according to claim 1, wherein order to establish a transmission link for a streaming data transmission between the considered server and the mobile terminal, this latter sends a RTSP setup message towards said server which is intercepted and modified by the proxy equipment in order to establish a continuous RTP transmission link between said proxy equipment and said considered server and a discontinuous transmission link for streaming data transmission between said proxy equipment and said mobile terminal.

4. Method according to claim 3, wherein the transmission link between the mobile terminal and the proxy equipment is managed by taking into consideration RTSP messages from said mobile terminal and the specificities of their mutual discontinuous connection.

5. Method according to claim 3, wherein prior to the sending of the RTSP setup message by the mobile terminal, the considered server sends streaming session description data to the mobile terminal, said description data being recorded by the proxy equipment in order to reserve adapted resources on the discontinuous network and to setup the means needed for the discontinuous transmission link.

6. Method for providing streaming services to a mobile terminal belonging to a discontinuous coverage network, wherein said method consists, upon each request of streaming services from said mobile terminal, in providing a transmission link or connection between said terminal and the concerned streaming server by using the method according to claim 1.

7. Communication system able to provide a transmission link adapted for a streaming data traffic between a server and a mobile terminal connected or belonging to a discontinuous coverage network, wherein it also comprises a proxy equipment comprising cache or buffer means for receiving and storing at said equipment streaming data intended for said mobile terminal, said proxy equipment being able to establish a streaming connection or session between said proxy equipment and said mobile terminal, upon request of a service from said terminal requesting streaming data, forward streaming data to said mobile terminal when this latter is detected to be under the coverage of and/or connected to said discontinuous coverage network and establish a continuous data and signaling transmission link with the server to provide said requested streaming data to said proxy equipment.

8. Communication system for performing the method of claim 1, wherein said communication system is able to provide a transmission link adapted for a streaming data traffic between a server and a mobile terminal connected or belonging to a discontinuous coverage network, wherein it also comprises a proxy equipment comprising cache or buffer means for receiving and storing at said equipment streaming data intended for said mobile terminal, said proxy equipment being able i) to establish a streaming connection or session between said proxy equipment and said mobile terminal, upon request of a service from said terminal requesting streaming data and ii) to forward streaming data to said mobile terminal when this latter is detected to be under the coverage of and/or connected to said discontinuous coverage network.

* * * * *